United States Patent [19]
Yaita

[11] 4,081,225
[45] Mar. 28, 1978

[54] STEAM APERTURE DEVICE

[75] Inventor: Masato Yaita, Souwa, Japan

[73] Assignee: Sekisui Kaseihin Kogyo Kabushiki Kaisha, Japan

[21] Appl. No.: 726,750

[22] Filed: Sep. 27, 1976

[30] Foreign Application Priority Data

Sep. 30, 1975 Japan ............................. 50-118611
Oct. 17, 1975 Japan ............................. 50-142151
Dec. 12, 1975 Japan ............................. 50-168180

[51] Int. Cl.² ........................................... B29D 27/00
[52] U.S. Cl. ................................. 425/4 R; 251/333; 425/817 R; 249/141
[58] Field of Search ................. 425/4 R, 817 R, 812, 425/437, 242 R, 470, 547, 542, 543, 552; 264/50, 51, DIG. 83; 249/141; 137/535; 251/149.8, 333, 148-152

[56] References Cited

U.S. PATENT DOCUMENTS

| 3,191,907 | 6/1965 | Schmidt | 251/333 |
| 3,837,769 | 9/1974 | Erlenbach | 425/4 R |

FOREIGN PATENT DOCUMENTS

| 2,302,906 | 7/1974 | Germany | 425/817 R |
| 538,353 | 5/1973 | Switzerland | 425/817 R |

*Primary Examiner*—Francis S. Husa
*Assistant Examiner*—Mark Rosenbaum
*Attorney, Agent, or Firm*—Armstrong, Nikaido, Marmelstein and Kubovcik

[57] ABSTRACT

A steam aperture device in a mold for use in preparing a foamed article. The steam aperture device comprises an aperture member extending therethrough and a moving member movably inserted in the aperture member. The aperture member forms a truncated conical wall progressively enlarged toward the end on one side and a cylindrical wall on the other side, both walls having a common axis. The moving member has a truncated conical surface corresponding to the truncated conical wall and a cylindrical surface, the moving member forming a gap between the truncated conical surface and the truncated conical wall when the moving member is raised from the aperture member. A steam passage is formed in at least one of the aperture member and the moving member, one end of the steam passage being opened on the other side and the other end of the steam passage communicating with the gap formed when the moving member is raised.

9 Claims, 14 Drawing Figures

STEAM APERTURE DEVICE

BACKGROUND OF THE INVENTION

1. Field of the Invention

This invention relates to a steam aperture device in a mold for use in preparing a foamed article.

2. Description of the Prior Art

In order to prepare a foamed article of thermoplastic resin, a method has hitherto been used in which a mold is used having a cavity of a desired shape. Foamable beads of the thermoplastic resin are placed in the cavity, steam is blown into the cavity to foam and expand the beads until the beads are fused together in the cavity to form an integral foamed article, and the article is taken out from the cavity. In this instance, it is required that the mold be provided with a number of apertures, each of which has a small size so that the steam can pass through it, and softened and foamed resin cannot pass through it. The apertures are called "steam apertures".

Perforations or slits have hitherto been used for the steam apertures. The perforations used are small apertures, about 1 mm in diameter. The perforations have been located in a plate constituting a cavity wall either by perforating the plate or by embedding in the plate a number of small aperture members, each having a perforation. Likewise the slits have been made either by perforating the plate or by embedding in the plate a number of small members, each having a slit.

When a mold provided with the perforations or the slits is used for preparing a foamed article from the foamable beads, especially if the foamable beads are of great expanding ability, foamed particles have been liable to penetration into the perforations or the slits. The penetrating particles give rise to projections on the surface of the article when they remain on the article, and the penetrating particles give rise to conspicuous flaws on the article if they have been torn away from the article, thus they have decreased the quality of the product. Further, if the penetrating particles remain in the perforations or the slits, the steam is sometimes prevented from passing through the perforations or the slits, so that it becomes impossible to use the mold.

SUMMARY OF THE INVENTION

The present invention aims to eliminate the above drawbacks and provide a steam aperture means having no possibility of the resin particle penetrating into the perforations or the slits.

According to the present invention a steam aperture means in a mold for use in preparing a foamed article is provided which comprises an aperture member having an aperture extending therethrough and a moving member movably inserted in the aperture. The aperture forms a truncated conical wall progressively enlarged towards the end on one side and a cylindrical wall on the other side, both walls being positioned in common with their axes. The moving member has a truncated conical surface corresponding to the truncated conical wall and a cylindrical surface, the moving member giving rise to a gap between the truncated conical surface and the truncated conical wall when the moving member is projected from the aperture member. A steam passage is provided in at least one of the aperture member and the moving member, one end of the steam passage being opened on the other side and the other end of the steam passage being communicated with the gap formed when the moving member is projected.

BRIEF DESCRIPTION OF THE DRAWINGS

The steam aperture device in this invention is illustrated in the accompanying drawings, in which.

DETAILED DESCRIPTION OF THE PREFERRED EMBODIMENT

Figure 1:
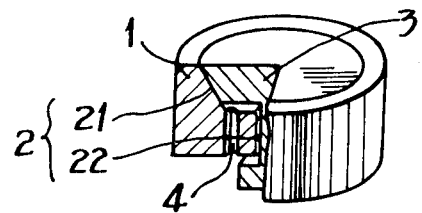
FIG. 1 is a perspective view of an example of the steam aperture device, partly cut away, in this invention.

Referring now to FIG. 1, the steam aperture device comprises an aperture member 1 in the form of a cylinder having an aperture 2 extending through the aperture member and a movable member 3 inserted in the aperture 2. Aperture 2 is formed by a truncated conical wall 21 becoming progressively wider towards the end on the cavity side (on the upper side) and a cylindrical wall 22 on the other side (on the lower side), the conical wall 21 and the cylindrical wall 22 being located with their axes in common. The cross-sectional area of cylindrical wall 22 is made to be smaller than that of the small circle on truncated cone forming truncated conical wall 21. Movable member 3 is designed to be able to move in aperture 2 in the direction of the aperture axis, and is shaped to have on its outer surface a conical surface which can be contacted closely with conical wall 21. A steam passage 4 is provided around cylindrical wall 22, and the steam passage 4 is opened at the small circle on the truncated cone. Two or more of steam passages 4 may be provided, and four steam passages 4 are preferably provided. Preferably aperture member 1 and movable member 3 are made of metal, most preferably of brass.

Figure 2:
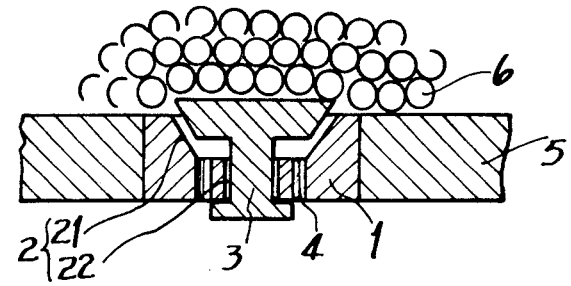
FIGS. 2 and 3 are cross-sectional views of the steam aperture device shown in FIG. 1, wherein the device is in a working state.

The steam aperture device shown in FIG. 1 may be used, for example, as follows: Referring to FIG. 2, aperture member 1 is embedded in cavity plate 5 of iron or aluminium. In order to embed aperture member 1 in cavity plate 5, it is convenient to provide each of aperture member 1 and cavity plate 5 with a thread and to screw aperture member 1 in cavity plate 5. Alternatively, aperture member 1 may be knurled on the outer surface thereof and driven into cavity plate 5. Instead, aperture member 1 may be prepared integrally with cavity plate 5 from the beginning. Foamable polystyrene beads 6 are placed in the cavity (on the upper side) of the mold thus prepared. Then the steam is introduced into the other side (on the lower side) of cavity plate 5, the steam is allowed to pass through passage 4 and reaches movable member 3, which is raised by the steam, as a result the steam is further passed through a gap between movable member 3 and truncated conical wall 21 to enter into the cavity of the mold. Such a state is shown in FIG. 2.

Figure 3:
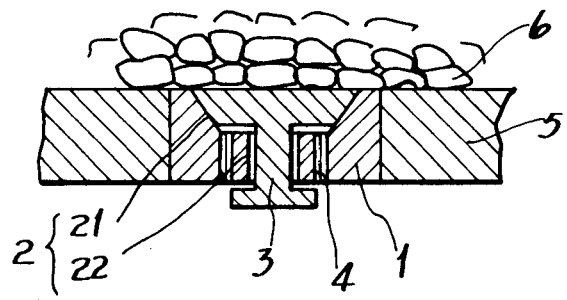

When the steam is allowed to enter into the cavity, foamable beads are heated and expanded. When the beads are expanded, movable member 3 is returned to its lowered position by the expansion pressure of the beads. Thus, movable member 3 is allowed to contact closely with truncated conical wall 21 and the gap between them is closed. Such a state is shown in FIG. 3. Thus, the steam aperture means according to this invention gives rise to a large gap while the beads are foaming until the foaming is completed in the cavity, and closes the large gap after that moment. Consequently, the mold provided with the above-mentioned means prevents a foamed article from forming a flaw on the surface thereof, and produces a foamed article of excellent quality.

Figure 4:
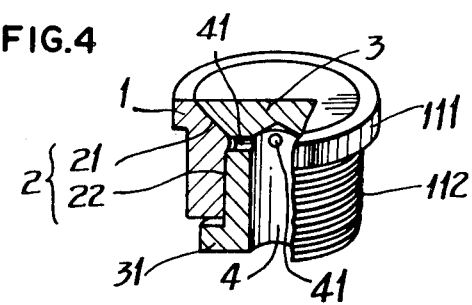
FIG. 4 is a perspective view of another example of the steam aperture device, partly cut away, in this invention.
Figure 5:
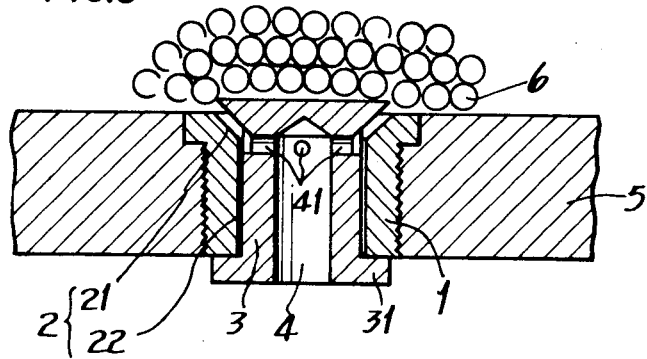
FIG. 5 is a cross-sectional view of the steam aperture device in FIG. 4 and in a working state.

In the examples as shown in FIGS. 1 to 3, steam passage 4 is provided in aperture member 1, however, steam passage 4 may be provided in movable member 3. FIGS. 4 and 5 show another example of the steam aperture device wherein steam passage 4 is provided in movable member 3.

In FIGS. 4 and 5, the corresponding portions are denoted by the same reference numerals as in FIGS. 1 to 3. The example in FIGS. 4 and 5 is different from that in FIGS. 1 to 3 merely in that steam passage is formed in movable member 3. More particularly, one end of steam passage 4 is always opened at the lower end of movable member 3, and the other end of steam passage 4 is opened at the lower end of the conical surface on movable member 3. The steam passage 4 may be opened at a portion on the conical surface of movable member 3. When movable member 3 is raised from aperture 2, steam passage 4 communicates with the gap formed between conical wall 21 and conical surface of movable member 3. In this instance, it is preferable that steam passage 4 be symmetrically branched to form plural openings 41 at the lower end of the conical surface on movable member 3. It is also preferable that movable member 3 be provided with ring 31 on the other end of the cylindrical surface, and movable member 3 can be moved in aperture 2 until ring 31 contacts the end of aperture member 1.

The steam aperture device shown in FIG. 4 is prepared as an independent product, which can be provided in the cavity plate in the mold without difficulty. More particularly, aperture member 1 is provided with annular projection 111 at the end in the direction that movable member 3 is raised, and also with a thread 112 on the remaining outer surface. As shown in FIG. 5, when cavity plate 5 is provided with a thread mating for the thread 112, cavity plate 5 can be provided with the steam aperture device without difficulty by screwing the steam aperture device in cavity plate 5. For this purpose, it is preferable that the steam aperture device and cavity plate should be made of metal, for example, the steam aperture device is made of brass and the cavity plate of iron or aluminium. Alternatively, the steam aperture device may be made integrally with cavity plate 5, that is, without using the independent steam aperture device which has been made separately from cavity plate 5.

Figure 6:
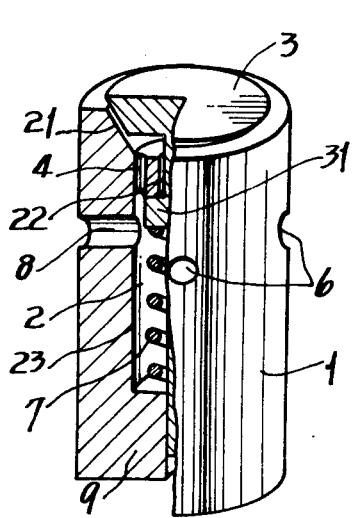
FIG. 6 is a perspective view of further another example of the steam aperture device, partly cut away, in this invention.
Figure 7:
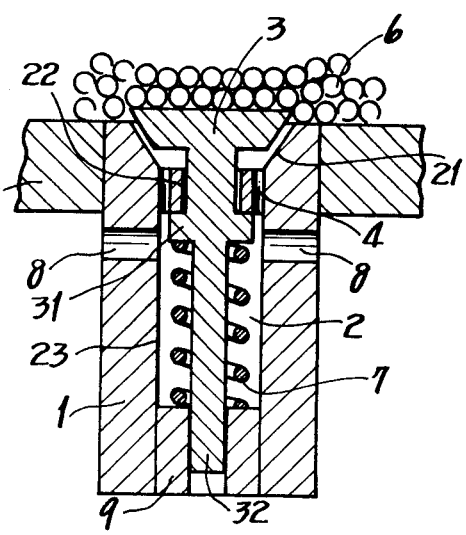
FIG. 7 is a cross-sectional view of the steam aperture device shown in FIG. 6 and in a working state.

According to another aspect of the present invention, an improved steam aperture device is provided which comprises a spring interposed between the movable member and the aperture member. The spring pushes the movable member so that the movable member rests in the aperture or is raised from the aperture, and thus the spring ensures that the movable member closes or opens the gap between the aperture member and the movable member. FIGS. 6 and 7 show examples of the steam aperture device wherein the spring is used. Referring to FIGS. 6 and 7, as in the preceeding drawings, aperture member 1 is provided with aperture 2 extending through aperture member 1, and movable member 3 is inserted in aperture 2. The aperture 2 forms a truncated conical wall 21 becoming progressively wider towards the end of the cavity surface side (on the upper side in the drawing), while aperture 2 forms a cylindrical wall 22 on the other side (on the lower side in the drawing). The conical wall 21 and cylindrical wall 22 are located with their axes in common. The steam aperture device in FIGS. 6 and 7 are different from that in the preceding figures merely in the respect that aperture 2 is provided with narrow portion 23 in the middle part of aperture 2, the spring 7 is inserted in aperture 2, and the movable member 3 is extended beyond ring 31 in the lower direction to form a leg 32.

In FIGS. 6 and 7, spring 7 is located around leg 32 of movable member 3, and interposed between ring 31 and lower stopper 9, by which spring 7 is compressed. Thus, spring 7 exerts movable member 3 so that movable member 3 may be projected from aperture 2 (in the upper direction in the drawing), until ring 31 is collided with the lower end of narrow portion 23. Strength exerted by spring 7 may be adjusted by controlling the degree to which lower stopper 9 is inserted in aperture 2. For this purpose, lower stopper 9 is preferably provided with a thread on the outer surface thereof, cylindrical wall 22 is also provided with a thread mating with said thread, and thus lower stopper 9 can be moved along cylindrical wall 22.

In FIGS. 6 and 7, steam passage 4 is provided in the narrow portion 23. Steam passage 4 communicates, at one end thereof, with a gap which is formed when movable member 3 is raised from aperture member 2, and at the other end, with the exterior of aperture member 1. In order that steam passage 4 communicates with the exterior of aperture member 1, passage 8 is provided in aperture member 1. Preferably a plurality of passages 8 are provided symmetrically on the outer surface of aperture member 1. As can be easily inferred from the steam aperture device in FIGS. 4 and 5, passage 8 may be provided in movable member 3 instead of mold member 1. Spring 7 may be provided so as to push movable member 3 into aperture 2, in contrast with the steam aperture device shown in FIGS. 6 and 7.

The steam aperture device shown in FIGS. 6 and 7 are used as follows: Movable member 3 is at first raised from aperture 2 by means of spring 7 as shown in FIG. 7, and foamable beads 6 are then filled in the mold cavity. Thereafter the steam is blown into the mold cavity in this state, wherein the steam is at first passed through passages 8 to enter into aperture 2, then via steam passage 4, further through a gap formed between truncated conical wall 21 and movable member 3, which is pushed by spring 7 to open, and then into the mold cavity. Thus, foamable beads 6 are heated by the steam and subsequently foamed. When foamable beads 6 are foamed, movable member 3 is pushed into aperture 2 by the foaming pressure of the beads while resisting the force of spring 7, until movable member 3 is moved to close the gap.

According to the steam aperture device in this invention, as mentioned above, movable member 3 is commonly raised from aperture 2 by means of spring 7, and movable member 3 is pushed back into aperture 2 when subjected to foaming pressure of the foamable beads. Thus, the steam aperture device ensures that the cavity is filled with the beads and subsequently the steam is blown into the cavity, and nevertheless enables the obtaining of a foamed article having a smooth outer surface, without leaving any trace of the steam aperture device on the article surface.

According to still another aspect of this invention, an improved steam aperture device is provided comprising improvements which are made in connection with both the shape of the edge of truncated conical wall 21 on aperture 2 and the shape of the corresponding portion of the truncated conical surface of movable member 3. More particularly, the improvements comprise portion 24 which is formed at the end of truncated conical wall 21 on aperture 2 which has the form of an enlarged circular plate, and the portion 33 which is formed, corresponding to portion 24, at the top of movable member 3 and has the form of the corresponding circular plate, as seen in FIGS. 8 to 10.

Figure 8:
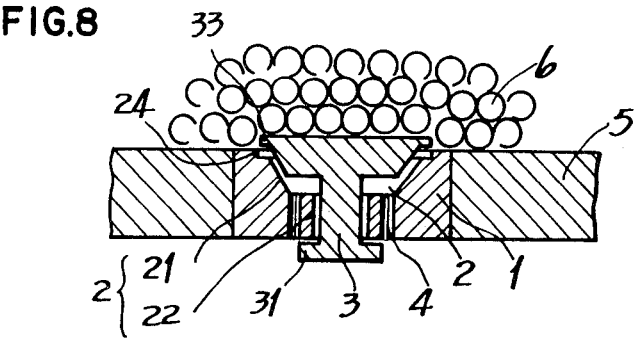
FIGS. 8 to 10 are cross-sectional views of different examples of the steam aperture device in this invention.

The steam aperture device shown in FIG. 8 is similar to that in FIG. 2, but is different in that truncated conical wall 21 is partly enlarged at the end thereof by a wall 24 in the form of a circular groove of a small thickness, and movable member 3 is correspondingly provided at the top thereof with a projecting portion 33 having the form of a circular plate mating with the wall 24.

Figure 9:
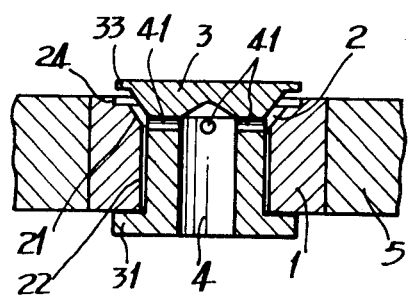

The steam aperture device shown in FIG. 9 is similar to that in FIG. 5, but is different in that an enlarged portion 24 having the form of a circular groove is formed at the end of truncated conical wall 21 on aperture member 1, and an enlarged portion 33 having the form of a corresponding circular plate is formed at the end of the truncated conical surface on movable member 3.

Figure 10:
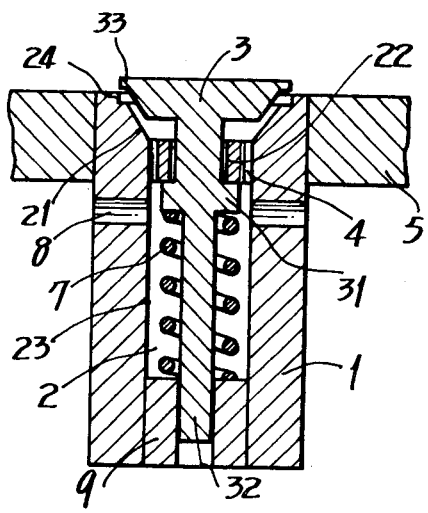

The steam aperture device shown in FIG. 10 is similar to that in FIG. 7, but is different, alike in the preceding examples, in that an enlarged portion 24 is formed on conical wall 21, and that a corresponding enlarged portion 33 is formed on the conical surface of movable member 3.

When the improved steam aperture device having enlarged wall portion 24 and enlarged surface portion 33 is compared with the normal steam aperture device having no such portions, the improved device produces a smaller gap between the aperture member 1 and movable member 3, if both movable members are raised an identical distance and both devices are viewed from inside of the cavity. The improved device accordingly causes less problems with respect to the gap clogged by the foamable or foamed beads. Further, when movable members 3 rests in aperture 2, the improved device closes the gap more completely. Moreover, when the steam is passed through the gap, the improved device disperses the steam in a wider range, since the steam strikes the circular plate formed on enlarged portion 33 immediately before the steam enters the mold cavity, and therefore the foamable beads are more uniformly heated. It is understood that the improved device gives rise to the same further advantages which were mentioned for the normal device.

A single-walled mold and a double-walled mold have been used for preparing a foamed article. The steam aperture device in this invention can be used for both molds. The steam aperture device gives rise to the most remarkable advantage when used for the single-walled mold.

The single-walled mold has a structure in which the mold is merely made of perforated plates which constitute the cavity wall, and the mold does not contain a steam chamber except for the mold cavity. In contrast, the double-walled mold has a structure in which the mold is made of inner plates and outer plates, the inner plates corresponding to the perforated plates in the single-walled mold and the outer plates added thereto. Each of the outer plates is combined with each of the inner plates to form a steam chamber between them. In either mold, the steam passages have hitherto been perforations which are always opened and of such small sizes that the perforations permit the steam or gases to pass through them but do not permit the softened resin to pass. The steam aperture device can be used instead of the perforations in either mold.

As mentioned above, the steam aperture device in this invention can give rise to remarkable advantages when used for a single-walled mold, and the reasons for this are due to the fact that the steam aperture device will act as a kind of check valve. More particularly, the steam aperture device shown in FIGS. 1 to 10 are all of the structure that the steam can pass through the device from the lower portion to the upper portion in the drawings, but, cannot pass in the opposite direction. A steam aperture device having this structure has never been provided in the cavity plate of the mold for preparing a foamed article. Now that a steam aperture device has been provided in the cavity plate of the mold, a pipe for introducing the steam can be directly connected with the steam aperture device, and accordingly it is possible to directly introduce the steam into the cavity, that is, without passing through the steam chamber formed between the inner plates and the outer plates.

According to yet another aspect of this invention, a mold for preparing a foamed article of thermoplastic resin is provided which comprises a mold, at least one check valve provided in a cavity plate of the mold, a pipe for introducing the steam, and a pipe for cooling water, the check valve further comprising a movable member which forms a gap while receiving a force towards the cavity, and which shuts the gap while receiving an adverse force from the cavity. The pipe for introducing the steam is directly connected to the check valve, and the pipe for cooling water is provided to cool the outside surface of the cavity plate.

Figure 11:
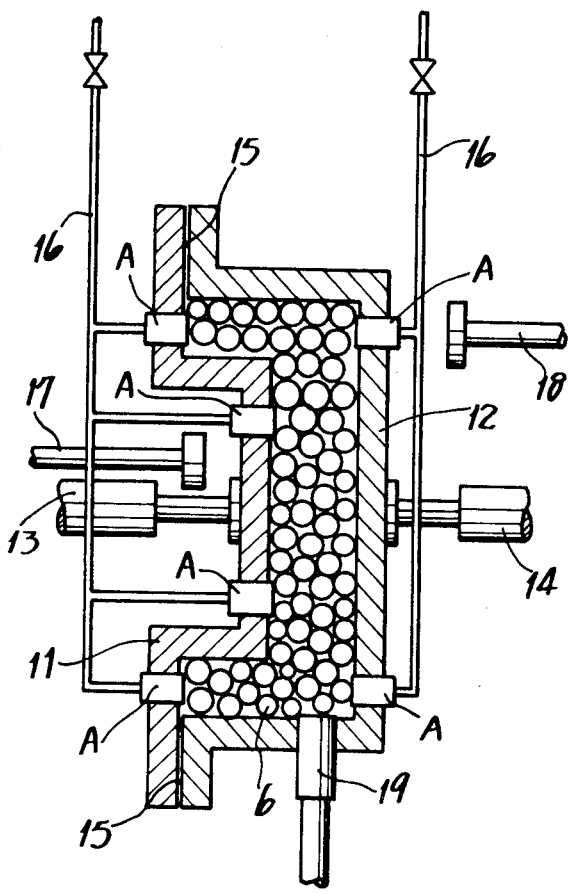
FIG. 11 is a cross-sectional view of an example of a mold used in the preparation of a foamed article and provided with the steam aperture device in this invention.

An example of above mentioned mold is shown in FIG. 11. Referring to FIG. 11, male mold 11 is supported by fixed arm 13, female mold 12 is movably supported by piston 14, and female mold 12 is mated with male mold 11 to form a cavity, leaving a small gap 15 around the cavity. Male mold 11 and female mold 12 are provided with check valve A, which may be the steam aperture device according to this invention, and the check valve A is connected with the pipe 16 for introducing the steam. Check valve A can produce a gap, through which the steam is introduced into the cavity from pipe 16. Cooling means 17 is positioned at a short distance from male mold 11 to provide water to cool the male mold 11. Likewise, cooling means 18 is positioned at a short distance from the female mold 12 to provide water to cool the female mold 12. Nozzle 19 supplies the cavity with the foamable beads.

Figure 12:
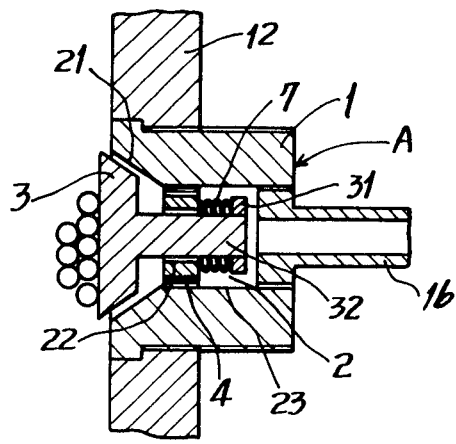
FIG. 12 is a cross-sectional view of the steam aperture device shown in FIG. 11 and in a working state.

FIG. 12 shows in section an example of check valves A, which is identical with the steam aperture device as mentioned above, which is provided in female mold 12. The steam aperture device in FIG. 12 is almost identical with that in FIG. 7. The device in FIG. 12 is different from that in FIG. 7 in that ring 31 is mounted on the end of leg 32 of movable member 3, spring 7 acts so as to hold movable member 3 in aperture 2, a steam pipe 16 is used instead of lower stopper 9, which is directly connected with the end of aperture member 1, and accordingly passage 8 is omitted.

The mold shown in FIG. 11 is used as follows: At first piston 14 is operated so as to advance female mold 12 towards male mold 11 until a cavity is formed between the molds, leaving a small gap 15 around the cavity, and then foamable beads 16 are placed in the cavity through nozzle 19 by means of compressed air. Thereafter the mold is completely closed, and then steam is introduced into the cavity from pipe 16 through steam aperture device A to heat foamable beads 6, to cause the beads to foam. When beads 6 are foamed in the cavity and are fused together to form an integral foamed article, the article pushes movable member 3 in steam aperture device A in the outward direction, and movable member 3 closes the gap between aperture member 1 and movable member 3 in cooperation with spring 7. As a result, the steam supply is stopped. Thereafter cooling water is supplied from cooling means 17 and 18 to cool male mold 11 and female mold 12, and accordingly the foamed article in the mold cavity is cooled. Then the mold is opened to take out the foamed article from the mold. Thus the foamed article is obtained.

In the mold shown in FIG. 11, since the steam inlet device, i.e., check valve is provided in the cavity plate and the steam pipe is directly connected to the steam aperture device, the steam is directly introduced in the cavity from the steam pipe. Thus, when the mold in FIG. 11 is compared with the conventional double-walled mold wherein steam is first filled in the chamber between the inner plate and the outer plate, and then enters into the cavity, the steam is decreased in the amount which is necessary for preparing the foamed article, and the time period is also decreased for heating the mold. Further, it is convenient that the steam supply is automatically stopped in the mold in FIG. 11, when the steam passage is closed by movable member 3, when the foamed article has been prepared in the cavity. Furthermore, the foamed article does not have a conspicuous trace of the steam aperture device owing to the closing of the steam passage, and accordingly has a good appearance. The mold according to this invention gives rise to the advantages as mentioned above.

Figure 13:
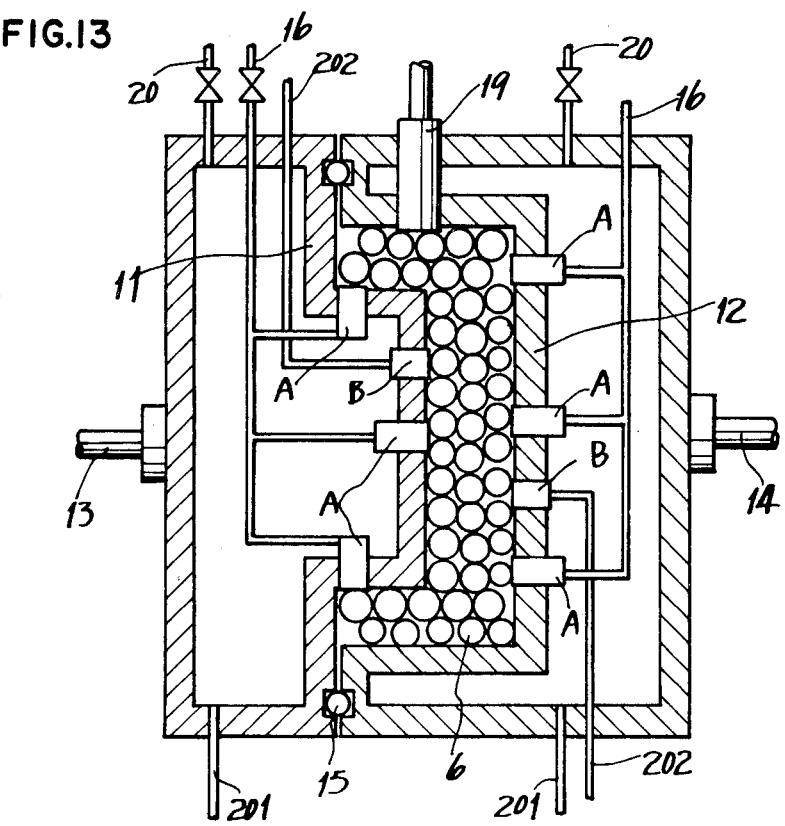
FIG. 13 is a cross-sectional view of another example of a mold used in the preparation of a foamed article and provided with the steam aperture device in this invention.

FIG. 13 shows an example of the double-walled mold provided with the steam aperture device according to the present invention. The mold in FIG. 13 is identical with the mold in FIG. 11 in that the mold comprises male mold 11 and female mold 12, which are either maintained in a given position by fixed support 13 or movably maintained by piston 14. Further, the mold in FIG. 13 is also identical with that in FIG. 11 in that foamable beads are placed in the cavity by the air flow through nozzle 19. Furthermore, the mold in FIG. 13 is identical with that in FIG. 11 in that male mold 11 and female mold 12 are provided with steam aperture devices A, which are connected with steam pipes 16. However, the mold in FIG. 13 is different from the mold in FIG. 11 in that male mold 11 and female mold 12 are of a double-walled structure, and the pipes for introducing cooling water 20 and pipes for discharging cooling water 201 are connected with the chamber formed in the male mold 11 and female mold 12. Further, the mold in FIG. 13 is different in that the mold can be tightly closed by means of packing material 15' interposed between abutted portions in the male mold 11 and female mold 12, and accordingly the female mold is provided with vent B connected with a pipe 202 so that the air is discharged from the cavity when the cavity is filled with foamable beads by pneumatic conveyance.

Figure 14:
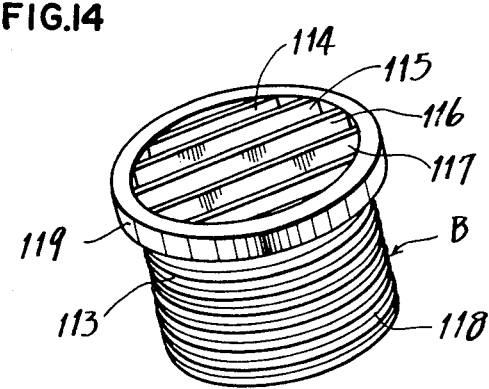
FIG. 14 is a perspective view of an example of a vent used in the mold shown in FIG. 13.

It is to be understood that the mold in FIG. 13 can be used as the mold in FIG. 11 and that the mold in FIG. 13 acts in the same manner as the mold in FIG. 11. However, the mold in FIG. 13 is different from that in FIG. 11 in that cooling water is introduced through pipe 20 into a chamber formed between double walls and is discharged through pipe 201. For the vent B the conventional steam aperture, or a perforation which has been used as a steam passage in the conventional mold may be used. FIG. 14 shows an example of an element for vent B, which includes a metal tube 113 and several metal sheets 114, 115, 116 . . . . . which are placed in and secured to metal tube 113 in a parallel relation, and which forms several slits between the metal sheets. The slits have such minute width that the air and water are allowed to pass through the slits but the softened resin is not allowed to pass through the slits. Element B has a thread 118 on the outer surface of metal tube 113, and also an enlarged portion 119 on the top of metal tube 113. Thread 118 is to fix element B by screwing it in the cavity plate, and enlarged portion 119 is to level the top of element B with cavity surface of the cavity plate. In use, it is preferably to connect a vacuum pump with pipe 202 connected to vent B and to forcibly discharge the air and other fluid from the cavity. This gives rise to the advantages that the steam is more effectively circulated and that foamable beads are more effectively conveyed by the compressed air.

Although FIGS. 11 and 13 show the mold wherein the steam aperture device A is provided in both male mold 11 and female mold 12, the steam aperture device A may be provided merely in either male mold 11 or female mold 12. It is also the case as to vent B, and vent B may be provided in either male mold 11 or female mold 12, though vent B is provided in both molds in FIG. 13.

The mold provided with the steam aperture device in this invention gives rise to the advantages that the steam is saved for heating, and heating time is reduced. The mold brings about further advantages in that the mold produces foamed articles, which have no conspicuous flaws formed by the steam aperture device and which have an excellent appearance, because the gap for passing the steam and the air is closed when the foamed article has been completed.

A particular example of a mold provided with the steam aperture device according to this invention is given hereinbelow. The steam aperture device used herein is as shown in FIG. 4, and aperture member 1 in the device has an outside diameter of about 20 mm on threaded portion 112, and a height of about 12 mm. Aperture 2 has truncated conical wall 21, which a large circle of about 15 mm in diameter, a smaller circle of about 10 mm, and a height of about 3 mm, and aperture 2 has also a cylindrical wall 22, the diameter of which is about 10 mm. Movable member 3 has an outer surface which can be closely contacted by both truncated conical wall 21 and cylindrical wall 22, and movable member 3 can be moved a maximum distance of 0.7 mm by means of ring 31. In movable member 3, steam passage 4 forms an opening having a diameter of about 5 mm on the side of ring 31, and four openings 41 having a diameter of about 1 mm on the base of the conical surface. The steam aperture device is made of brass. The mold is made of aluminium and is provided with a number of the steam aperture devices at intervals of about 80 mm in the cavity plate thereof. The mold is of a single-walled structures, as shown in FIG. 11.

The mold was the density of 0.1 g/cc, and then the steam at 120° C was blown into the mold for about 15 seconds to foam the particles. Then the foamed article was taken out from the mold, and was found to be of an excellent quality. It had on the surface neither projections nor flaws made by taking off projections. The foamed article had no substantial markings formed by the steam aperture devices and was excellent in appearance.

I claim:

1. In a mold for preparing a foamed article of thermoplastic resin, said mold comprising an aperture means provided with an aperture extending through a cavity plate of the mold and a moving means inserted in said aperture, the aperture having a truncated conical wall progressively enlarged towards the end on one side and a cylindrical wall on the other side, said conical wall and said cylindrical wall having a common axis, said moving means having a cylindrical surface and a truncated conical surface corresponding to said truncated conical wall, said moving means forming a gap between the truncated conical surface and the truncated conical wall when the moving means is raised from the aperture means, the improvement which comprises providing at least one steam passage around the cylindrical wall in the aperture means, one end of the steam passage being open at the small circular end of truncated conical portion of the aperture means, and the other end of the steam passage being open at the back side of the cavity plate.

2. A mold as defined in claim 1, wherein a spring is interposed between said moving means and said aperture means, wherein said moving means is positioned in said aperture means so as to be able to move against the force of said spring.

3. A mold as defined in claim 1, wherein said aperture means includes an enlarged circular groove at the end of said truncated conical wall, and said moving means includes an enlarged portion on the top of the truncated conical surface which corresponds to said enlarged circular groove.

4. A mold as defined in claim 1, wherein said mold is a single-walled structure.

5. A mold as defined in claim 1, wherein said mold is a double-walled structure.

6. The mold as defined in claim 1 wherein a pipe for introducing the steam is directly connected with the end of the aperture means on the back side of the cavity plate.

7. The mold of claim 1 which further comprises a pipe for cooling water provided proximate to the cavity plate so as to cool the outside surface thereof.

8. In a mold for preparing a foamed article of thermoplastic resin, said mold comprising an aperture means provided with an aperture extending through a cavity plate of the mold and a moving means movably inserted in said aperture, the aperture having a truncated conical wall progressively enlarged towards the end on one side and a cylindrical wall on the other side, said conical wall and said cylindrical wall having a common axis, said moving means having a cylindrical surface and a truncated conical surface corresponding to said truncated conical wall, said moving means forming a gap between the truncated conical surface and the truncated conical wall when the moving means is raised from the aperture means, the improvement which comprises providing in the moving means at least on steam passage, one end of which is open at the lower end of the cylindrical surface of the moving means, and the other end of the passage being open at the lower end of the conical surface of the moving means.

9. The mold defined in claim 8 wherein a pipe for introducing the steam is directly connected with the end of the aperture means on the back side of the cavity plate.

* * * * *